Figure 1:
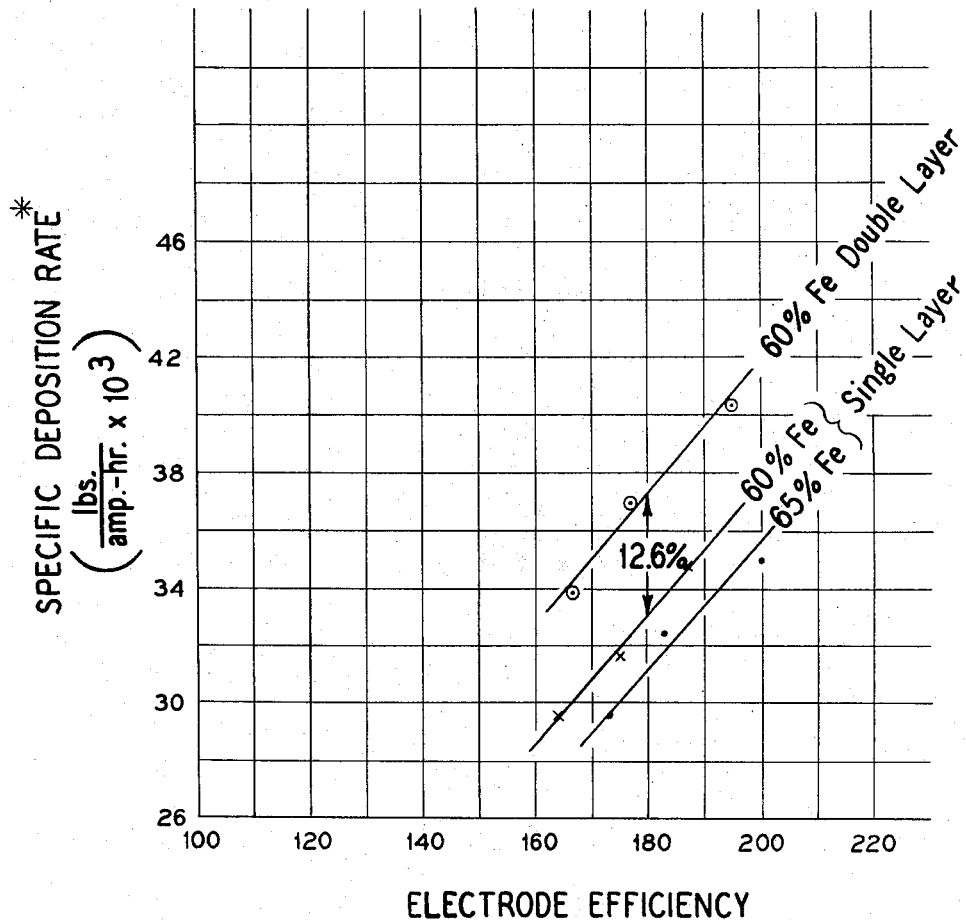

United States Patent [19]
Russell

[11] 3,783,234
[45] Jan. 1, 1974

[54] ARC WELDING COATED ELECTRODE

[75] Inventor: Robert J. Russell, Yorktown Heights, N.Y.

[73] Assignee: Union Carbide Corporation, New York, N.Y.

[22] Filed: Mar. 31, 1972

[21] Appl. No.: 240,150

[52] U.S. Cl. .............. 219/146, 117/202, 117/204, 117/205
[51] Int. Cl. ............................................. B23k 35/22
[58] Field of Search ................ 219/146, 145, 137, 219/73; 117/202–207; 148/24, 26

[56] References Cited
UNITED STATES PATENTS

| | | | |
|---|---|---|---|
| 2,664,488 | 12/1953 | Mouton | 117/205 |
| 2,345,758 | 4/1944 | Lincoln et al. | 219/137 |
| 2,839,433 | 6/1958 | Kriewall | 117/204 |
| 2,983,632 | 5/1961 | Griffiths et al. | 117/205 |
| 1,525,840 | 2/1925 | Weed | 219/146 |
| 3,102,827 | 9/1963 | Kriewall et al. | 117/204 |
| 2,544,000 | 3/1951 | Wasserman | 117/204 |

Primary Examiner—R. F. Staubly
Assistant Examiner—George A. Montanye
Attorney—Paul A. Rose et al.

[57] ABSTRACT

A multi-coated stick electrode having an inner layer surrounding a metal core wire and containing a majority of the arc stabilizers in said electrode. The outer layers contain a majority of the metal powder.

8 Claims, 2 Drawing Figures

*Avg. of AC, DCSP, DCRP

*Avg. of AC, DCSP, DCRP

ARC WELDING COATED ELECTRODE

This invention relates to coated welding electrodes for use in arc welding. More particularly, this invention relates to such welding electrodes which have multiple layer coatings.

Coated electrodes, which are frequently referred to as stick electrodes, are widely used in industry today to perform various welding jobs. Accordingly, there are many different kinds of stick electrodes in use.

In some types of electrodes, including high efficiency electrodes, metal powder is added to the coating to add alloying additions to the weld puddle as well as to increase the weld length yield and metal deposition rate. Increases in weld length per electrode and deposition rate both are important in reducing the cost of labor in welding. It is known, however, in the case of iron powder additions to the coating that the deposition rate ceases to increase and, in fact, begins to decline as the iron powder content in the coating increases beyond about 50 to 60 weight per cent. It is believed that this is caused by the coating becoming more conductive as metal concentration increases. In the immediate vicinity of the arc, the coating becomes highly conductive, thus allowing the arc to spread, decreasing the current density and causing the burnoff rate to decrease. In addition, a conductive coating also gives rise to arcing through the coating, a difficulty commonly referred to as side arcing. Further still, a coating too high in metallic content tends usually to form a shallow, uneven cone about the arc tip allowing the arc to wander, lowering the operating voltage, hindering use of the drag welding technique, and reducing the shielding and apatter control generally afforded by a deeper cone.

In the particular case of iron powder additions to the coated electrode, the problem of lower-than-expected deposition rates, side arcing, and improper cone formation at high iron powder concentration has been sought to be solved by employing specifically prepared iron powder in the coating, such as oxidized Fe powder or Fe powder of precisely controlled particle size. In addition, fibrous, low density insulators such as cellulose, mica, and others have been utilized to render the coating less conducting. Still in addition, specific and particular soluble silicate binder combinations together with large percentage additions of such have been used to minimize side arcing and burning off rate decrease caused by coatings of high metallic content. In addition, the thickness of the coating itself may be increased until the coating resistance is sufficient to prevent side arcing and provide better cone formation. Also, careful mixing procedures and specialized mixing equipment designed to assure better iron particle separation with specially blended silicates of low dielectric constant have been used to promote improved reliability in burnoff rate retention and side arc prevention. All of these above techniques to control coating electrical conductivity difficulties can each be shown to be uneconomical and/or unreliable and/or to cause adverse side effects with regard to overall electrode operability and/or slag and weld metal characteristics.

It now has been found that a coated stick electrode with coating of more than about 50 percent iron powder, hereinafter referred to from time to time as high iron powder, can be made which has a high burn-off-rate and associated high deposition rate without side arcing or poor cone formation; it has been found that such an electrode can be made with an especially smooth operating arc, very low spatter, and essentially a free peeling slag. Specifically, this discovery now makes it possible to fabricate:

1. high efficiency electrodes having a total iron powder content in the coating greater than about 50 percent with 10 percent to 15 percent and higher specific burn-off-rates than available with prior art electrodes.
2. high efficiency electrodes having a total iron powder content in the coating greater than about 50 percent which exhibit excellent restrike ability, good cone formation, and no side arcing, even with thin coatings (coating diameter/core wire diameter <2).
3. high efficiency electrodes having an iron powder content greater than about 50 percent with reduced arc stabilizer content which, nevertheless, exhibit very stable arcs, low spatter, and self-peeling slags.

This discovery is predicated on the use of an electrode whose coating consists of two layers, wherein the inner layer contains sufficient non-conducting ingredients to electrically insulate the outer layer from the current carrying core wire. Generally, the majority of the arc stabilizers are placed in the inner layer near the arc to achieve optimum stabilization while the bulk of the metal powder is placed in the outer layer insulated from the core wire by the inner layer. In this way, the maximum amount of metal powder may be added to the coating without the usual adverse side effects due to higher conductivity and reduced stabilizer content. The minimum amount of stabilizing ingredients may be used because of their inner layer location next to the arc.

Thus, it is the object of this invention to provide a non-side arcing, high deposition rate, dual layered, high efficiency electrode with excellent restrike capability whose outer layer contains greater than 60 wt. percent iron powder and whose inner layer electrically insulates the core wire from the outer layer.

It is further an object of this invention to provide such an electrode with a very stable arc and low spatter operation by concentrating a majority of the arc stabilizing ingredients in the inner layer and placing those ingredients with adverse arc effects in the outer layer.

Figure 2:
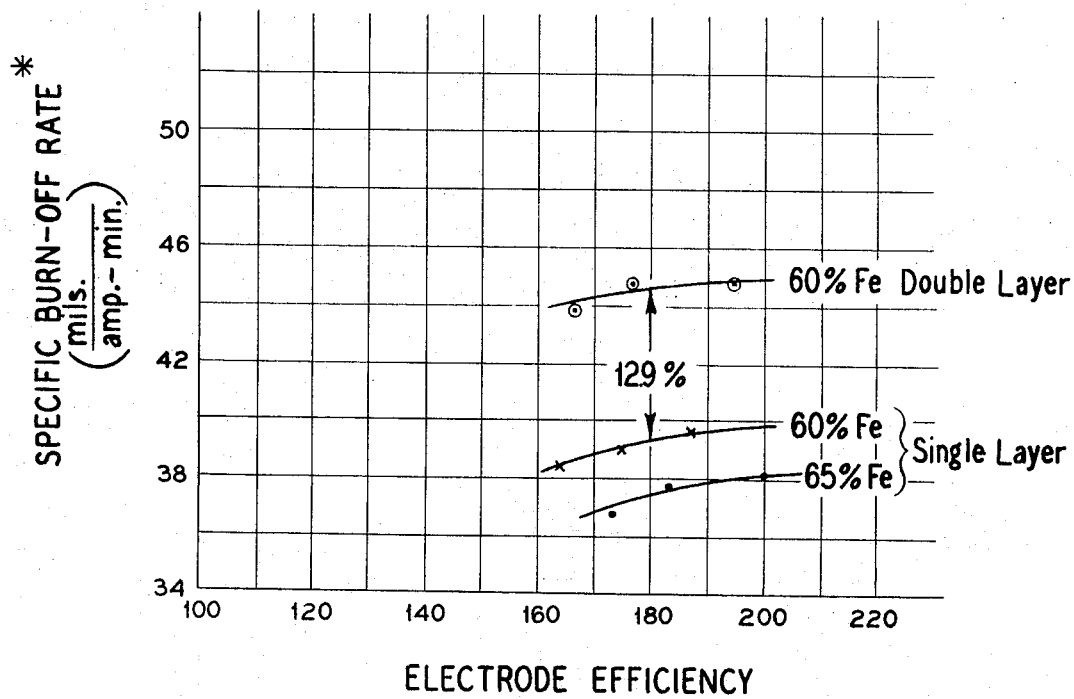

Other objects of the invention will become apparent from the following description and drawings wherein FIG. 1 is a curve of specific burn-off-rate vs. electrode efficiency and FIG. 2 is a curve of specific deposition rate vs. electrode efficiency.

Generally, the above objects are accomplished by a coated arc welding electrode comprising a metallic core and a coating consisting of two layers so formulated to optimize, in so far as possible, all the functions of the coating. The inner layer consists of a major proportion of all arc stabilizers together with any other ingredients required for sufficient electrical insulation. The inner layer should release moisture quickly but without cracking to a low level during baking in order to promote low spatter and optimum deslagging characteristics. In these deep-cone forming electrodes, the inner layer may contain gas-forming ingredients such as cellulose or carbonates because gas formation high inside the cone provides shielding without increased spatter. The remaining inner layer ingredients will consist of those ingredients needed to satisfy other coating functions such as binding, gas shielding, deoxidation, slag chemistry, etc., but whose effects on the arc are not undesirable. For iron powder electrodes with outer layers of greater than about 60 percent iron, it is essential that the inner layer insulate the conductive outer layer from the core wire.

The outer layer consists of metal powders and those other ingredients not necessarily essential for optimum arc performance, but, nevertheless, needed to satisfy the other coating requirements. For thick coated electrodes, it is necessary that the outer layer be sufficiently conductive to allow smooth cold restriking. The insulating inner layer does not prevent restriking because the inner fused surface of the cone of a partially burned electrode forms a bridge between the core wire and conducting outer layer. The outer layer, in general, must be so formulated to satisfy the general requirements of a stick coating with regard to the coating's mechanical integrity and hygroscopicity.

It is obvious that this invention is applicable to any electrode type (including the gravity feed electrode) containing high concentrations of iron powder such as the iron oxide type (AWS EXX27), the rutile type (ASE EXX24), and the basic type (ASE EXX27). This discussion will limit itself to discussing the rutile type though application to the above categories or any other high Fe powder electrode is obvious to those skilled in the art.

For purposes of this disclosure, the following terms shall have the meanings as listed below:

Electrode efficiency shall mean grams of weld deposited divided by grams of core wire melted times 100% (g weld deposited/g core melted × 100%)

Specific deposited rate shall mean weight of metal deposited divided by arc-on-time.

Specific burn-off-rate shall mean length of electrode melted divided by arc-on-time;

Major proportion or majority shall mean a proportion of ingredient greater than any other proportion of the ingredient in the coating;

Coating shall mean the combination of the inner layer and the outer layer;

Side arcing shall mean establishment of an arc from the coating at a point somewhere along the sides of the electrode when that point contacts a grounded object.

Good cone shall mean a symetrical cup formed around the arc tip of the electrode exhibiting a depth of at least one-half the core diameter and showing a substantially even depth around periphery; and Weld length yield shall mean length of single-pass weld deposited divided by length of electrode melted.

For purposes of this disclosure, all composition percentages are given in weight per cent and refer to the dry-mixed ingredients prior to liquid silicate additions.

In the rutile type coating, $TiO_2$ acts both as an arc stabilizer and as a slag former and modifier. In this system, a higher iron content in the coating is achieved primarily by lowering the rutile content resulting in a thinner slag over the weld metal. Under these minimum slag conditions, a certain minimum rutile (titania) content nevertheless is required to achieve full slag coverage. For this slagging function, the rutile may be supplied from either or both the inner and outer coating layers, though the majority of the rutile will be placed in the inner layer to achieve optimum arc stabilization.

Another function of the rutile, that of electrical insulation of the core wire from the outer high-iron layer, is shared by the other non-conducting inner layer ingredients. This insulating function is accomplished by holding the total percentage of conducting ingredients — particularly iron, but also the conducting ferro-alloys — in the inner layer below that threshold value which would allow either or both (a) side-arcing through the coating under an open circuit voltage of 100 volts or less and (b) conduction through the coating in the area of the arc which prevents adequate cone formation and reduces burn-off rate.

Specifically, in order to achieve a high efficiency rutile-type electrode of high deposition rate and optimum arc stabilization which provides a protective slag of full coverage and easy removal, these criteria must be observed:

1. To obtain a high overall iron content in the coating, the outer layer must contain at least 60 percent up to a maximum of about 90 percent iron powder. The exact percentage chosen depends upon the efficiency desired.

2. The inner layer content of conductive ingredients (including iron powder, other metal powders, and conductive ferro-alloys) must be chosen such that the combined resistance across the two layers is sufficiently high:

a. to prevent side-arcing under 100 volt open circuit voltage;
   b. to maintain the electrode burn-off-rate at that rate characteristic of a 50 percent iron powder concentration; and
   c. to allow proper cone formation at the electrode tip to facilitate using the "drag" technique.

To achieve these objectives, the inner layer conductive ingredient content must decrease (may increase) as the inner layer thickness decreases (increases) or the outer layer conductive content increases (decreases). The optimum inner/outer combination is best determined by experiment.

3. The majority of the overall titania (rutile) and other stabilizer content should be placed in the inner layer to achieve optimum arc stabilization and optimum inner layer electrical resistivity.

For example, according to the three principles given above, coating formulations have been developed at the 60 percent, 65 percent and 70 percent overall iron powder concentrations. These are given in Table I.

In each of the electrodes referred to in Table I, the volume ratio of outer/inner is approximately 2.1/1; the thickness ratio of outer/inner in approximately 1.3/1 and the weight ratio ranging from 2.3/1 to 2.5/1. An electrode of the desired efficiency may be designed from any of the compositions by judicious selection of the coating thickness, i.e., the thicker the coating, the higher the efficiency.

As an example, the 60 percent Fe composition was extruded onto 3/16 inch diameter core wires and tested on AC, DCSP, and DCRP at currents of 250 to 280 amps, and compared to single layer electrodes of the same composition. Burn-off-rate and deposition rate data were measured and the results are shown in FIGS. 1 and 2. The three points represent coating diameters of approximately 0.370, 0.390 and 0.415 inches, respectively. It can be seen that the 60 percent iron double layer electrodes have burn-off-rates about 10 to 15 percent higher than the single layer electrodes and a correspondingly higher deposition rate. It would be expected as seen from the curve for the 65 percent Fe single layer electrode that single-layer burn-off-rates will decrease further as the iron content is increased. This effect is minimized in double layer electrodes which means that increased coating While Table I lists the generally preferred compositions and the proportions of such ingredients in the

TABLE I

|  | 60% Fe | | | 65% Fe | | | 70% Fe | | |
| --- | --- | --- | --- | --- | --- | --- | --- | --- | --- |
|  | Inner | Outer | Overall | Inner | Outer | Overall | Inner | Outer | Overall |
| Dry mix ingredients, weight percent: | | | | | | | | | |
| Fe powder | 33.0 | 72.0 | 60.2 | 33.0 | 78.1 | 64.8 | 41.0 | 81.4 | 70.0 |
| Rutile | 40.0 | 4.0 | 14.9 | 40.0 | 1.5 | 12.8 | 38.6 | | 11.0 |
| Slag modifiers | 14.0 | 3.7 | 6.8 | 14.0 | | 4.1 | 3.5 | | 1.0 |
| Ferro-alloys | 4.5 | 9.0 | 7.6 | 4.5 | 9.2 | 7.8 | 8.0 | 8.0 | 8.0 |
| Extrusion aids | 6.5 | 8.3 | 7.8 | 6.5 | 8.2 | 7.7 | 6.3 | 8.0 | 7.5 |
| Gas formers | 2.0 | 3.0 | 2.7 | 2.0 | 3.0 | 2.7 | 2.6 | 2.6 | 2.6 |
| Total | 100.0 | 100.0 | 100.0 | 100.0 | 100.0 | 100.0 | 100.0 | 100.0 | 100.0 |
| Silicates (grams/100 grams dry mix) | 14.0 | 14.0 | 14.0 | 14.0 | 14.0 | 14.0 | 14.0 | 14.0 | 14.0 |
| Approximate outer/inner wgt. ratio | | 2.3/1 | | | 2.4/1 | | | 2.5/1 | | iron contents will translate directly into increased deposition rates.

Thus, it is possible to achieve higher than expected burn-off-rates and deposition rates for high iron powder electrodes using the double layer concept of this invention.

Further, it is important to compare this new double-layered E 7024 electrode with those E 7024 electrodes produced and sold domestically. These latter generally have been found to contain about 40 percent to 50 percent iron powder in the coating and exhibit electrode efficiencies of about 135 percent to 145 percent. Even at this lower iron powder level, significant operational improvement can be achieved by concentrating the majority of the rutile and/or other stabilizers in the coating in the inner layer. The double-layered electrode of this invention has a high concentration of stabilizer content in the inner layer (e.g. about 40 percent rutile), but rather low overall stabilizer content (e.g. less than 15 percent rutile) when averaged out over both layers. The domestic electrodes generally contain about 20 percent to 30 percent rutile in their single layer.

In 11 blind comparison tests, 11 different welders chose the two layered high efficiency electrode as being smoother in operation, showing less spatter, and having better slag removal (particularly in the direct current modes) when compared with the lower efficiency prior art electrodes. In Table II below are listed the data of one such test comparing the 60 percent iron double-layered electrode with two prior art electrodes. All electrodes were of 3/16 inch core wire diameter and the tests were conducted using AC current.

inner and outer layers, it has been found that electrodes can be according to the invention within the ranges set forth in Table III; the overall range given in Table III assumes a weight ratio of about 2.5/1 outer layer over inner layer. This ratio will change depending upon the particular inner layer - outer layer combination selected.

TABLE III

|  | Inner | | Outer | | Overall | |
| --- | --- | --- | --- | --- | --- | --- |
|  | Min. | Max. | Min. | Max. | Min. | Max. |
| Fe | 20 | 50 | 60 | 90 | 50 | 80 |
| Rutile | 20 | 50 | 0 | 15 | 5 | 20 |
| Slag modifiers | 0 | 40 | 0 | 10 | 0 | 15 |
| Ferroallys | 0 | 30 | 0 | 12 | 5 | 10 |
| Extrusion aids | 4 | 10 | 4 | 10 | 4 | 10 |
| Gas formers | 0 | 10 | 1 | 6 | 1 | 5 |

The maximum iron or metal powder in the inner layer is ≤ 50 percent in order to limit the electrical conductivity of the inner layer. The outer layer with its minimum of 60 percent metal powder always contains more than half of the total metal powders in the coating. It is preferred to keep the metal powder content in the inner layer greater than about 20 percent. Lower percentages result in the thermal conductivity being too low, causing core wire heatup at high currents resulting in porosity and poor bead shape. The amount of rutile in the inner layer should be greater than about 20 percent to achieve optimum arc stabilization. However, it is obvious that if other stabilizers are used, one skilled

TABLE II

|  | Coating diameter, inch | Electrode efficiency (percent) | Arc current (amps.) | Voltage (volts) | Burn-off rate (in. per min.) | Deposition rate (lbs. per hr.) |
| --- | --- | --- | --- | --- | --- | --- |
| Electrode A | .382 | 138 | 265 | 30.5 | 10.5 | 6.7 |
| Electrode B | .386 | 142 | 266 | 30.0 | 10.4 | 6.9 |
| 60% Fe double layer | .387 | 170 | 265 | 29.0 | 10.6 | 8.5 |

The double-layered electrode with its obvious advantage in deposition rate was selected by the welder as being the best with respect to arc smoothness, low spatter and slag removal.

in the art could lower the rutile content. The other ingredients specified and the quantities given are not as critical, but are necessary in order to make a useable electrode.

The metal powders contemplated by this invention include iron powder, ferro-alloys or other electrically-conductive metal powders such as aluminum, magnesium, nickel, chromium, titanium, etc. Ferro-alloys added as deoxidizers include, for example, ferro-silicon, ferro-manganese, ferro-titanium and ferro-manganese- silicon. While rutile is the principle arc stabilizer contemplated, other arc stabilizers are, for example, potassium oxide, ferro-titanium, potassium silicate, potassium titanate and potassium oxalate. Rutile also acts as a slag former, but other slag formers are silica and manganese oxide, for example. Slag modifiers contemplated are silica, soda, alumina, magnesia, potassium oxide, manganese oxide, and calcium oxide, and/or the natural mineral containing combinations of these oxides. The gas formers usually included in the coating are cellulose and carbonates. Extrusion aids, some of which are also very important in modifying the slag, include the following ingredients or their equivalents; bentonite; kaolin, mica; cellulose gums; alginates and others. The binding agents are usually sodium and-/or potassium silicates.

Having described the invention generally and with reference to certain preferred embodiments, it should be obvious to one skilled in the art that certain modifications can be made both in the ingredients used and the percentages thereof depending on their location in the inner or outer layer, and the respective thickness of the layers, without departing from the spirit and scope of the invention. It is obvious for example that ingredients which are the equivalents of the typical ingredients specified can be used without departing from the spirit of the invention.

I claim:

1. A high metal powder, high efficiency, high deposition rate arc welding electrode comprising
   a solid metallic core; and
   a dual coating containing metal powder, arc stabilizer and other necessary ingredients to make a usable electrode, and having an inner layer surrounding said core and containing less than about fifty (50) weight-% metal powder and an outer layer surrounding said inner layer and containing greater than sixty (60) weight-% metal powder with the total metal powder content in the coating being greater than about 50 percent;
   said inner layer containing the major proportion of all said arc stabilizers in said electrode and being electrically non-conductive to electrically insulate said core from said outer layer, the total resistanc of said dual coating preventing side arcing when voltage across said coating is up to 100 volts and burn-off-rate decline.

2. Electrode according to claim 1 wherein the metal powder is iron.

3. A high iron powder, high deposition rate arc welding electrode comprising
   a solid metallic core; and
   a dual coating containing metal powder and rutile powder having an inner layer surrounding said core and containing less than about fifty (50) weight-% iron powder and a major proportion of all the rutile powder in said electrode, whereby the amount of rutile needed to stabilize the arc is minimized; and an outer layer surrounding said inner layer containing greater than sixty (60) weight-% iron powder, the total iron powder content in the coating being greater than 50 percent; the remainder of said coating being made up of ingredients including slag formers, binders, extrusion aids, fluxing ingredients, gas formers and deoxidizers.
   said coating having a total resistance preventing side arcing when the voltage across said coating is up to 100 volts and burn-off-rate decline.

4. An arc welding electrode containing iron powder and rutile and comprising a metallic core and an inner layer surrounding said metallic core and containing a majority of said rutile in said electrode and an outer layer surrounding said inner layer and containing from about 60 to about 90 percent of said iron powder, the total iron powder content in said coating being greater than 50 percent, the remaining ingredients in said inner and outer layers include slag formers, binders, extrusion aids, fluxing ingredients and gas forming ingredients.

5. An arc welding electrode comprising a metallic core, a coating having an inner layer and an outer layer
   said inner layer surrounding said core and consisting essentially of 20–50 percent iron powder; 20–50 percent rutile and the balance being selected from slag modifiers, ferro-alloys, extrusion aids and gas formers
   said outer layer surrounding said inner layer and consisting essentially of 60–90 percent iron powder, the remainder being selected from rutile, slag modifiers, ferro-alloys, extrusion aids and gas formers, the overall coating containing iron powder in the range of 50–80 percent and rutile in the range of 5–20 percent when the weight ratio of the outer layer to the inner layer is in the range of 2/1 to 3/1.

6. An iron powder arc welding electrode having a metallic core with a coating (dry mix) containing 60 percent iron powder and being made up of an inner layer surrounding said metallic core and consisting essentially of about 33.0 percent iron powder, 40.0 percent rutile, 14.0 percent slag modifiers, 4.5 percent ferro- alloys, 6.5 percent extrusion aids and 2.0 percent gas formers and 14.0 grams/ 100 grams of the above ingredients of a silicate binder, and an outer layer surrounding the inner layer and consisting essentially of about 72.0 percent iron powder, 4.0 percent rutile, 3.7 percent slag modifiers, 9.0 percent ferro-alloys, 8.3 percent extrusion aids, 3.0 percent gas formers and 14.0 grams/100 grams of the above ingredients of a silicate binder.

7. An iron powder arc welding electrode comprising a metallic core and a coating (dry mix) containing 65 percent iron powder and being made up of an inner layer surrounding said metallic core and consisting essentially of about 33.0 percent iron powder, 40.0 percent rutile, 14.0 percent slag modifiers, 4.5 percent ferro-alloys, 6.5 percent extrusion aids, and 2.0 percent gas formers and 14.0 grams/100 grams of the above ingredients of a silicate binder, and an outer layer surrounding the inner layer and consisting essentially of about 78.1 percent iron powder, 1.5 percent rutile, 9.2 percent ferro-alloys, 8.2 percent extrusion aids and 3.0 percent gas formers and 14.0 grams/ 100 grams of the above ingredients of a silicate binder.

8. An iron powder arc welding electrode comprising a metallic core and a coating (dry mix) containing 70 percent iron powder and being made up of an inner layer surrounding said metallic core and consisting essentially of about 41.0 percent iron powder, 38.6 percent rutile, 3.5 percent slag modifiers, 8.0 percent ferro-alloys, 6.3 percent extrusion aids, 2.6 percent gas formers and 14.0 grams/100 grams of the above ingredients of a silicate binder and an outer layer surrounding the inner layer and consisting essentially of about 81.4 percent iron powder, 8.0 percent ferro-alloys, 8.0 percent extrusion aids, 2.6 percent gas formers and 14.0 grams/100 grams of the above ingredients of a silicate binder.

* * * * *